MANUFACTURE OF FLUORINE COMPOUNDS

Louis G. Anello, Lake Parsippany, and Cyril Woolf, Morristown, N.J., assignors to Allied Chemical Corporation, New York, N.Y., a corporation of New York
No Drawing. Filed Dec. 23, 1960, Ser. No. 77,805
13 Claims. (Cl. 23—14)

This invention relates to nitrosyl fluoride-hydrogen fluoride complexes, processes for making the same, and more particularly to manufacture of nitrosyl fluoride.

Nitrosyl fluoride, NOF, B.P. minus 56° C., has been prepared by passing nitrosyl chloride, NOCl, B.P. minus 5° C., over silver fluoride at elevated temperatures, and by reacting nitric oxide with elemental fluorine. Such methods are not adapted for commercial development, e.g. because fluorinating agents such as silver fluoride require separate stage refluorination, and use of elemental fluorine is always undesirable.

A major object of the invention is to provide processes for making nitrosyl fluoride from nitrosyl chloride and anhydrous hydrogen fluoride. The latter is a commonly employed fluorinating agent, and both raw materials are readily available at low cost. Other objectives include provision of processes for making certain nitrosyl fluoride-hydrogen fluoride complexes which serve as highly satisfactory intermediates for production of nitrosyl fluoride. Another important object is to afford a procedure by which it is possible conveniently to recover for reuse an agent employed to dehydrofluorinate the complexes, and also to recover substantially all of the hydrogen fluoride constituent of the intermediate nitrosyl fluoride-hydrogen fluoride complexes.

In accordance with the invention, it has been found that nitrosyl chloride and hydrogen fluoride may be reacted readily, under anhydrous conditions, and in the absence of catalysts if desired, to form nitrosyl fluoride complexed with hydrogen fluoride. Also, it has been found that such complexes may be readily dehydrofluorinated, thereby breaking up the complexes to liberate vaporous nitrosyl fluoride as a recoverable sought-for product, and to form a residual compound which contains the hydrogen fluoride component of the NOF complex and from which residual compound such hydrogen fluoride may be readily stripped out and returned for reuse in the initial reaction with fresh incoming nitrosyl chloride.

Procedurally, the invention involves reacting nitrosyl chloride and hydrogen fluoride under anhydrous conditions, to form nitrosyl fluoride-hydrogen fluoride complexes, technique being such as to provide preferably for recovery of the complexes as liquids, and in any case to separate the complexes from by-product HCl. When nitrosyl fluorid itself is the ultimate sought-for product, in accordance with the invention the nitrosyl fluoride-hydrogen fluoride complexes are dehydrofluorinated by subjecting the same to the action of suitable alkali metal fluoride which functions to remove the hydrogen fluoride component from the complexes to liberate nitrosyl fluoride as a recoverable vapor and to form a residual alkali metal fluoride salt which contains the hydrogen fluoride extracted from the complex. When practicing the invention as a continuous cyclic process, the residual alkali metal salt HF content which had been acquired from the complexes is separated out, such HF is returned for reaction with fresh incoming nitrosyl chloride, and the alkali metal fluoride reconstituted to its original form is returned for further use in the dehydrofluorinating stage. Hence, practice of the invention, as a whole and as an integrated cyclic process for production of NOF from NOCl and anhydrous HF, comprises in a first phase subjecting NOCl, under anhydrous conditions and at reactive temperature, to the action of HF in quantity sufficient to form a complex of NOF and HF and recovering the NOF·xHF complex free of by-product HCl and preferably as a liquid; in a second phase, dehydrofluorinating the complexed material by subjecting the same to the action of an alkali metal fluoride in quantity sufficient to react and combine with substantially all of the HF component of the complex material and thereby liberate NOF in recoverable vapor form; and in a third phase, subjecting residual acid alkali metal fluoride compound, containing HF abstracted from the complex, to hereindescribed treatment to decompose the same back to hydrogen fluoride and alkali metal fluoride in its initial form, the latter being reuseable as dehydrofluorinating agent, and the former as NOCl fluorinating agent.

In accordance with the invention, it has been found that nitrosyl fluoride and HF form complexes which correspond closely to NOF·3HF and NOF·6HF. Each material is a relatively stable, clear water-white liquid which fumes on exposure to moist air, and which can be distilled at atmospheric pressure. The NOF·3HF boils at about 95° C. at atmospheric pressure, and the NOF·6HF boils at about 68° C. at atmospheric pressure. The compounds respectively have specific conductances of 0.0503 and 0.0129 mho. The complexes are particularly useful as intermediates for nitrosyl fluoride as in accordance with this invention.

In practice of major phases of the invention, reactions of NOCl and HF to form the complexes appear to be summarizable as

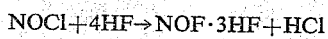

$$NOCl + 4HF \rightarrow NOF \cdot 3HF + HCl$$
$$NOCl + 7HF \rightarrow NOF \cdot 6HF + HCl$$

and when utilizing for example sodium fluoride as dehydrofluorinating agent, reactions appear to be represented by

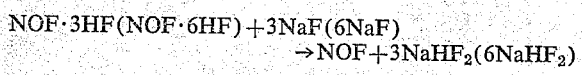

$$NOF \cdot 3HF(NOF \cdot 6HF) + 3NaF(6NaF)$$
$$\rightarrow NOF + 3NaHF_2(6NaHF_2)$$

Reaction of nitrosyl chloride and anhydrous hydrogen fluoride to form the complexes may be carried out in either liquid or gas phase, and either batchwise or continuous. While the invention is described mostly with reference to use of NOCl as starting material, in gas phase reactions, mixtures of NO and chlorine may be used in place of NOCl in the absence or presence of catalysts. It will be understood that herein use of the terms nitrosyl chloride or NOCl is intended, unless otherwise indicated, to include the equivalent mixtures of NO and chlorine. In gas phase reactions, where mixtures of NO and chlorine are employed it may be desirable to utilize a catalyst such as activated carbon to facilitate combination of NO and chlorine.

Temperatures utilized to effect reactions of NOCl and anhydrous HF may vary over a wide range, particular temperatures being dependent on such factors as whether the reaction is carried out in gas or liquid phase, batchwise or continuous, with or without reduced or superatmospheric pressure.

The low temperature limit is relatively unimportant and is mostly a matter of convenience and economy. Liquid phase reactions at least in the early stages may be carried out at relatively low temperatures well below the minus 5° C. boiling point of NOCl, for example at temperatures at least as low as minus 25° C.

It has been found that gas phase reactions of NOCl and anhydrous HF proceed significantly at temperatures as high as 600° C. and higher, experience shows that at high temperatures of the order of 1000–1100° C. about half of the charged NOCl is available for reaction with HF, and that on adequate cooling of the reaction zone exit, NOF·3HF complex is recoverable in liquid form. When working at high temperatures, the effect of dissociation of NOCl on the formation of nitrosyl fluoride complexes may be offset, as by the use of pressure or by adding an excess of chlorine to the reaction mixture to maintain equilibrium conditions in favor of the formation of the NOCl reactant. However, high temperature reactions offer no worthwhile operating advantages, and are not preferred. It has been found that, as to all embodiments of the invention, gas or liquid phase, conversions and general efficiencies begin to drop off markedly at about 250° C., and hence higher temperatures are undesirable, and in the more usual operations, temperatures are not substantially greater than 150° C. at atmospheric pressure.

As in the case of temperatures, mol ratios of HF to NOCl which may be employed may be varied within fairly wide limits with regard to all embodiments of the invention. In the case of continuous reactions, such ratio of incoming reactants applies to the continuous feed composition, and in batch reactions such ratio refers to ultimate ratio of total incoming reactants charged. Mol ratio of HF to nitrosyl chloride may lie in the range of 0.5:1 to about 10:1. Upper limit of HF is mostly a matter of convenience and economy since high ratios of HF necessitate recovery and recycling of larger quantities of HF. Conversely, low HF ratios result in large amounts of unreacted nitrosyl chloride, and require recovery of relatively large amounts of NOCl by distillation and recycle. More suitable HF:NOCl ratios lie in the range of about 3:1 to 8:1, and ratios in the range of about 4:1 to 7:1 are more usually employed. Selection of HF:NOCl ratio is more or less dependent upon the particular complex sought to be made. In the practice of the better embodiments of the invention, it is desirable to make and utilize the NOF·3HF complex. In this situation, the better practice is to utilize an HF:NOCl ratio of about 4.5:1 to 5.5:1. Such ratio effects substantially complete consumption of incoming NOCl and requires recycling of only a small amount of HF which can be readily accomplished.

Continuous gas-phase reaction of NOCl and HF is preferred. In this modification, nitrosyl chloride and hydrogen fluoride both in gas form are passed into a preferably unpacked reactor which may be tubular, made of e.g. nickel or nickel alloy, and mounted in an electrically heated furnace. The exit of the reactor may be connected to the base of a vertically disposed still made of nickel, packed if desired, and equipped at the head with a reflux condenser cooled to about minus 78° C. by means of a Dry Ice-acetone mixture. In operation, by-product HCl is continuously vented thru the reflux, while all other materials exiting the reactor, including the sought-for complexes and unreacted NOCl and HF, are trapped in the still in the liquid form. By means of suitable facilities, liquor collecting as still bottoms may be continuously drawn off for further distillation and recovery.

In any case, reaction conditions in the reactor should be such as to maintain all materials therein in the gas phase during residence in the reactor. Contact time may be in the range of 0.1–60 seconds, optimum being determinable by test run. Where inert diluent gases, such as nitrogen and $CO_2$, are employed, temperatures in the reactor may be as low as say 20° C. However, since use of diluent gases afford no substantial advantages, it is preferred to carry out the reaction in the absence of diluent gases in which instance higher reaction temperatures are maintained. Gas phase reaction may be conveniently and economically carried out at temperatures in the range of about 30–150° C. at atmospheric pressure. In the preferred embodiment of gas phase operation, temperatures are maintained just high enough to keep incoming reactants and reaction products, in the gas phase during reactor residence, e.g. in the range of about 50–110° C. at atmospheric pressure.

In the case of use of high ratios of HF to NOCl, complexed products, collecting as bottoms in the still immediately following the reactor usually comprise a mixture of the NOF·3HF and NOF·6HF, proportions of the latter being variable and dependent to some extent on the particular HF:NOCl ratio employed. As indicated, the still bottoms may be continuously withdrawn and fed to another still primarily for separation of unreacted HF and any possibly present unreacted NOCl. Subsequent to removal of unreacted HF and NOCl, the still residue is usually a more or less crude mixture of NOF·3HF and NOF·6HF which is a clear water-white liquid boiling in the range of about 63–100° C. This mixture of complexes may be employed as it is in the subsequently described production of NOF, or if desired such residue may be redistilled to recover the individual complexes, i.e. the NOF·3HF boiling at about 95° C., and the NOF·6HF boiling at about 68° C. In the better forms of practice, in which the preferred low HF:NOCl ratios of about 4.5:1 to 5.5:1 are employed the mixture of complexes comprises mostly the high boiling NOF·3HF.

Instead of gas phase reactions, reactions may be conveniently carried out in liquid phase either batch or continuous.

In batch procedure, liquid nitrosyl chloride may be run into a refrigerated and a stirred or otherwise agitated reaction vessel. Initial temperature of reaction, of course, will be below the boiling point of liquefied charge. Liquid HF is then gradually added. Reaction temperature may be allowed to rise slowly toward the end of the HF addition until a reaction temperature as high as 70–90° C. is reached. Procedure may be reversed, and liquid hydrogen fluoride initially fed into the reaction vessel, and liquid nitrosyl chloride gradually added. A lower limit of reaction temperature below about minus 25° C. affords no advantage. The upper limit of temperature is dependent on the necessity for maintaining a liquid phase in the reaction. Since the boiling point on the highest boiling complex is 95° C., this value represents about the upper limit of temperature at atmospheric pressure.

Liquid phase reaction may be carried out also by other convenient means. One such method for example, comprises passing NOCl and HF in suitable ratio, either as gases or liquids, into an agitated reaction vessel containing liquid complexed reaction product and held at temperature of say 60–80° C. Liquid product made may be continuously withdrawn from the reaction zone. Another form of continuous liquid phase reaction may comprise feeding liquid HF and liquid nitrosyl chloride through a tower suitably packed and maintained in the approximate temperature range. Another procedure for carrying out continuous liquid reaction may be effected by pumping liquid complexed reaction products thru a reaction zone into which the HF and NOCl reactants are continuously introduced either as gases or liquids, part of the issuing liquid products being withdrawn and part recirculated to maintain a liquid phase in the reaction zone in the desired temperature range.

The nature of all forms of the reaction of NOCl and HF is such as to permit use of atmospheric pressure. However, reduced or superatmospheric pressures may be employed in either liquid or gas phase reactions. Although no particular operating advantage is afforded by using reduced pressure, pressures above atmospheric may be used with advantage. In one convenient modification, liquid phase reaction is carried out at a temperature about 150° C. under a pressure of 200 p.s.i. In this modification pressure increases the solubility and concentration of the reactants in the liquid reaction mixture, with a reduction in reaction time, and eliminates the use of refrigeration which may be otherwise necessary to maintain the reactants in the liquid phase.

In accordance with a second phase of the invention process, the NOF·xHF complexes (the "x" referring to 3 or 6 or both according to context) made as above may be dehydrofluorinated to abstract the HF complexing components of the complexes and liberate NOF as a recoverable vapor. The dehydrofluorinating agents are alkali metal fluorides such as NaF, KF and systems represented generally by KF·xHF and NaF·xHF. When utilizing sodium fluoride as dehydrofluorinating agent, reactions involved are such as indicated by the third of the previously stated equations. NOF is a compound of known utility. For example, as known NOF may be reacted with BrCl to form NOBrF₄ which in turn, by heating or reaction with NaF, may be converted to BrF₃ which, when fluorinated by elemental fluorine, forms BrF₅, a known rocket fuel oxidizer.

Several methods for dehydrofluorinating the complexes may be used. According to one simple batch procedure, pulverized or ganular sodium fluoride may be added gradually to the liquid complex. While lower temperatures may be employed, preferably this operation is carried out at room temperature, e.g. 20° C., or higher. The reaction is exothermic, and is preferably conducted, as by control of rate of reaction or by applied cooling, so as to maintain temperature sufficiently below the 95° C. boiling point of the NOF·3HF complex to avoid appreciable carry-over of the latter in vapor form along with the evolved NOF. The result is that the sodium fluoride abstracts the HF complexing component of the complex, and NOF in vapor form is allowed to distill out of the reaction mass. The NOF may be condensed in a Dry Ice-acetone trap and redistilled for greater purity if desired. The HF is abstracted from the liquid complex by combination with sodium fluoride to form the resulting NaF·xHF system which can thereafter be heated to release combined HF and recover sodium fluoride. The HF is then recycled to the first step for further reaction with NOCl and the recovered sodium fluoride is reused to dehydrofluorinate additional NOF·xHF. Although the batch procedure just described may be satisfactorily carried to completion to release substantially all NOF from NOF·xHF and form the solid NaF·HF, we prefer to employ the continuous dehydrofluorinating method hereinafter described.

In another suitable method for dehydrofluorinating a NOF·xHF complex, the latter may be vaporized and passed thru a tower packed with granulated sodium fluoride and maintained at temperature of about 100–150° C. The gas issuing from the packed tower is NOF vapor which may be condensed and further purified as above indicated. The NaF reactor may be heated to temperature at 375–400° C. to release the combined HF, thereby reforming NaF which can be reused as a dehydrofluorinating agent. The released HF may be recycled. In another method, using an unpacked or suitably packed tower, liquid NaF·xHF having a NaF:HF ratio of about 1:2 may be continuously introduced at the top of the tower and allowed to flow countercurrently to a stream of gaseous complex material. NOF vapor is recovered as overhead product and liquid NaF·xHF having a NaF:HF ratio of about 1:2.5 to 1:3 may be continuously withdrawn from the bottom of the tower. Temperatures are maintained in the tower high enough to insure the free flow of the NaF·xHF liquor, and while such temperatures may be as high as 200° C., temperatures usually are in the range of say 125–175° C. The liquid NaF·xHF system from the bottom of the tower is heated to release combined HF until the NaF:HF ratio is about 1:2, at which ratio the NaF·xHF system is recycled to the top of the tower.

The preferred method of dehydrofluorinating the complexes is a procedure in which the NOF·xHF complex is continuously fed, with due regard to operating factors such as efficient contacting conditions and residence time, in liquid or gas form into an NOF generator containing a liquid alkali metal fluoride-xHF system maintained in the liquid condition by suitable adjustment of temperature and of the alkali metal fluoride:HF mol ratio. NOF is continuously evolved and discharged from the generator, and the desired alkali metal fluoride:HF mol ratio of the liquor in the generator is maintained by continuously withdrawing liquid alkali metal fluoride-HF system from the generator, removing some of the HF from the liquid system and continuously returning liquid system of reduced HF content to the generator. In this procedure, the alkali metal fluoride-xHF system may be of composition such as to be liquid, i.e. have a melting point, at temperature not higher than about 200° C., the preferred maximum dehydrofluorinating temperature of all embodiments. Preferably, as to composition, the liquid system maintained in the generator has an alkali metal fluoride to HF mol ratio of one alkali metal fluoride to not substantially less than two HF.

According to one preferred procedure, liquid NOF·xHF complex is continuously fed into an NOF generator in which there is maintained a liquid KF·xHF system in which the KF:HF ratio is about 1:2, i.e. the "x" of the KF·xHF is 2. Melting point of KF·HF is about 239° C., and compounds in the range of about KF:2HF and KF:3HF have melting points in the range of about 72–65° C.

Thus the KF:2HF system has a melting point of about 72° C., and to increase fluidity, temperature in the generator may be held at about 100° C. NOF is continuously evolved in the generator. In this embodiment temperatures above about 100–125° C. may be avoided to minimize vaporization of the incoming NOF·xHF complex and thus reduce entrainment of complex material with outgoing NOF product. Vapor pressure of HF above the liquid system is not critical since vapor phase HF will combine with the large excess of NOF vapor present to form a relatively small amount of NOF·xHF complex which leaves the generator in vapor form along with the NOF. On cooling the NOF to say minus 20° C. any entrained NOF·xHF complex may be condensed out and returned to the generator. Substantially pure NOF may be condensed and recovered as liquid by cooling to e.g. minus 70° C.

In maintaining the desired KF:HF ratio of the liquid in the generator the liquor is continuously withdrawn therefrom and introduced into an HF stripper which, in the present embodiment, may be maintained at a temperature of about 250° C. The HF, abstracted from the NOF·xHF complex fed into the generator, is volatilized out of the liquid KF·xHF system while in the stripper and returned to the primary reactor in which NOCl and HF are initially reacted to form the NOF·xHF complexes. Heating in the stripper may be such as to cut down the HF content of the liquid KF·2HF system to a KF·HF system of about 1:1. Such material has a melting point of about 239° C., at which temperature and composition the stripped liquid system is continuously returned to the NOF generator. It will be understood that procedural factors such as particular temperature, rates of feed of NOF·xHF complex and of stripped KF·xHF system to the generator, and rate of discharge of high HF liquor from the generator may be easily regulated so as to maintain in the generator a KF·xHF system of the desired composition.

With regard to the alkali metal fluoride-HF ratio maintained in the generator, we prefer to withdraw the liquor at a ratio of about 1:2 or a little higher, say 1:2.2. Higher ratios say of the order of 1:3 may be suitably maintained. However, the amount of HF abstracted by the alkali metal fluoride-HF system is a function of time and the reaction proceeds at a slower rate as the HF content of the liquor in the generator increases. Maintenance of the alkali metal fluoride-HF ratio in the generator at about 1:2 or 1:2.2, effects rapid and complete HF extraction from the NOF·xHF complex. With a generator liquor ratio of about 1:3, HF abstraction is substantially complete but noticeably slower. With a generator liquor ratio above about 1:4, HF abstraction from incoming NOF·xHF complex drops off to undesirable values.

The following illustrate practice of the invention.

Example I

The reactor employed was an unpacked nickel tube 1″ I.D. x 36″ long mounted in an electrically heated furnace 30″ long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by a Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol) of a fraction boiling in the range of minus 5 to zero degrees C. and comprising mostly NOCl; about 86 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and found to have a boiling point of about 68° C. The fraction was analyzed for total fluoride, NOF, HF and nitrogen and identified as a liquid NOF·6HF complex. The pot residue fraction on redistillation showed a boiling point of about 95° C.; and on chemical analysis for total fluorine, NOF, HF and nitrogen was identified as a liquid NOF·3HF complex. About 1.48 mols of HCl were recovered in the water scrubber, indicating an NOCl conversion to complexes of about 82% on the basis of NOCl consumed. Yield of complexes on the basis of NOCl converted was about 62%.

Example II

Apparatus and procedure employed were as in Example I. Throughout the run, the reactor was heated to about 75° C. During a period of about 11.5 hours, a vaporous mixture consisting of about 32.7 mols (654 g.) of HF and about 5.71 mols (374 g.) of NOCl was passed into the reactor. The average ratio of HF to NOCl was about 5.7 to 1. Reaction contact time was about 18 sec. On completion of the run, the condensate collected in the still was distilled and there were recovered about 48 gms. (0.73 mol) of a fraction boiling in the range of minus 5 to zero degrees C. and comprising mostly NOCl; about 85 gms. (4.3 mols) of a fraction boiling in the range of 17–25° C. and comprising mostly HF; and about 710 gms. of a pot residue boiling in the range of about 60–98° C. which on analysis was identified as a liquid mixture of NOF·3HF and NOF·6HF complexes in the ratio of approximately 2 to 1. About 4.34 mols (159 gms.) of HCl were recovered in the water scrubber, indicating an NOCl conversion to complexes of about 87% on the basis of NOCl consumed. Yield of complexes on the basis of NOCl converted was about 97%.

Example III

The reaction was carried out in more or less liquid phase in an externally heated nickel still pot equipped with an inlet for introduction of HF and NOCl, and with a superjacent still. During a period of about 11 hours, a vaporous mixture consisting of about 34.8 mols (697 g.) of HF and about 5.82 mols (382 g.) of NOCl was metered into the reactor. Ratio of HF to NOCl was about 6 to 1. Throughout the run, liquor in the pot was held at temperature of about 50–70° C. Products exiting the reactor were passed into the bottom of a superjacent vertically disposed nickel still packed with nickel "Heliopak," and provided at the top with a reflux condenser cooled by a Dry Ice-acetone mixture (minus 78° C.). The HCl formed passed through the reflux and was absorbed by a water scrubber located after the still. All other materials exiting the reactor were condensed and held in the still and pot during the run. On completion of the run, the liquor collected in the pot was distilled, and there were recovered about 39 gms. (0.59 mol) of a fraction boiling in the range of minus 5 to zero degrees C. and comprising mostly NOCl; about 85 gms. (4.3 mols) of a fraction boiling in the range of 17–25° C. and comprising mostly HF; and about 730 gms. of a pot residue boiling in the range of about 60–98° C. which on analysis was identified as a liquid mixture of NOF·3HF and NOF·6HF complexes in the ratio of approximately 2 to 1. About 4.55 mols (161 gms.) of HCl were recovered in the water scrubber, indicating an NOCl conversion to complexes of about 89% on the basis of NOCl consumed. Yield of complexes on the basis of NOCl converted was about 94%.

Example IV

Nitrosyl fluoride was made by the dehydrofluorination of composite liquid NOF·3HF—NOF·6HF complexes prepared as in Examples II and III. A nickel tower 1.5″ I.D. x 19″ long was packed with 620 g. (575 cc.) of NaF pellets and heated to 100° C. by means of an electrically heated furnace. The gaseous products exiting the tower were passed to a nickel still equipped at the head with a Dry Ice-acetone (−78° C.) reflux condenser, in which still substantially all gaseous products from the tower were condensed. During a period of about three hours, about 239 g. of composited complexes, containing NOF·3HF and NOF·6HF in proportions of about 67% NOF·3HF and 33% NOF·6HF, were vaporized and the vapor passed thru the NaF pellets held initially at temperature of 100° C. Contact time in the NaF tower was 86 sec. The reaction was exothermic and temperature rose to a maximum of about 150° C. At the end of the run, condensate in the still was refluxed and fractionated at about minus 49° C., and there were recovered as a condensate overhead about 50 g. of a blue liquid. In the particular apparatus employed, at low temperatures there was considerable heat loss, with the result that refluxing temperature did not correspond wholly with the known boiling point of NOF. However, infrared and other analysis identified the liquid as NOF. Yield of NOF on the basis of the total complexes fed was about 60%. Following completion of recovery of NOF, the sodium acid fluoride in the tower was heated for several hours at temperature in the range of about 265–350° C. to decompose the acid fluoride and liberate HF. About 5 mols of HF were recovered representing about 60% of the total HF absorbed by the NaF·$x$HF system.

We claim:

1. The process which comprises subjecting NOCl, under anhydrous conditions and at temperature substantially in the range of minus 25° C. to not more than 600° C., to the action of HF to form reaction products containing a nitrosyl fluoride-hydrogen fluoride complex boiling substantially in the range of 63–100° C. at atmospheric pressure, and recovering such complex from said reaction products.

2. The process which comprises subjecting NOCl, under anhydrous conditions and at temperature substantially in the range of minus 25° C. to not more than about 250° C., to the action of HF to form reaction products containing a nitrosyl fluoride-hydrogen fluoride complex boiling substantially in the range of 63–100° C. at atmospheric pressure, and recovering such complex from said reaction products.

3. The process of claim 2 in which reaction temperature is substantially in the range of 30–250° C.

4. The process of claim 2 in which the quantity of

HF is sufficient to provide a ratio of HF:NOCl in the range of 0.5:1 to 10:1.

5. The process of claim 2 in which the quantity of HF is sufficient to provide a ratio of HF:NOCl in the range of 3:1 to 8:1.

6. The process of claim 2 in which reaction temperature is substantially in the range of minus 25° C. to not more than about 150° C.

7. The process of claim 2 in which reaction temperature is above minus 25° C. but low enough to maintain NOCl, HF and nitrosyl fluoride-hydrogen fluoride complex reaction product in liquid phase.

8. The process which comprises subjecting NOCl, under anhydrous conditions and at temperature substantially in the range of minus 25° C. to not more than about 250° C., to the action of HF to form reaction products containing a nitrosyl fluoride-hydrogen fluoride complex boiling substantially in the range of 63–100° C. at atmospheric pressure, recovering such complex from said reaction products, dehydrofluorinating said complex by subjecting the same, at temperature substantially in the range of 20–200° C., to the action of alkali metal fluoride to react and combine with substantially all of the HF component of said complex and thereby liberate NOF in vapor form, and recovering said NOF.

9. The process which comprises subjecting NOCl, under anhydrous conditions and at temperature substantially in the range of minus 25° C. to not more than about 250° C., to the action of HF to form reaction products containing a nitrosyl fluoride-hydrogen fluoride complex boiling substantially in the range of 63–100° C. at atmospheric pressure, recovering such complex in liquid form from said reaction products, introducing said liquid complex into a liquor comprising an alkali metal fluoride-HF system having a melting point not higher than about 200° C., and having an alkali metal fluoride:HF mol ratio of one to not less than 2 and heated to temperature high enough to maintain the resulting mass in liquid phase to thereby effect combination of substantially all of the HF component of said complex with HF of said system and liberate NOF in vapor form, and recovering said NOF.

10. The process of claim 9 in which the alkali metal fluoride:HF mol ratio is substantially in the range of 1:2 to 1:4.

11. The process of claim 9 in which the alkali metal is potassium, and temperature of the said liquor system is not more than about 125° C.

12. A nitrosyl fluoride-hydrogen fluoride complex composition consisting of NOF and HF, said composition at standard conditions being a substantially clear, water-white liquid, having a boiling point of about 95° C. at atmospheric pressure and consisting of nitrogen, oxygen, fluorine and hydrogen in proportions equivalent to NOF·3HF based on total fluorine, NOF, HF and nitrogen chemical analyses.

13. A nitrosyl fluoride-hydrogen fluoride complex composition consisting of NOF and HF, said composition at standard conditions being a substantially clear, water-white liquid, having a boiling point of about 68° C. at atmospheric pressure, and consisting of nitrogen, oxygen, fluorine and hydrogen in proportions equivalent to NOF·6HF, based on total fluorine, NOF, HF and nitrogen chemical analyses.

References Cited by the Examiner

UNITED STATES PATENTS 2,939,766  6/60  Churchill _____ 23—153

OTHER REFERENCES

Haszeldine et al.: "Fluorine and Its Compounds," pages 20, 28, 29, 38, 67, London, Methuen and Co., Ltd., 1951.

Martin: "Fluorination of Volatile Inorganic Compounds," pages 136–7, from Inorganic Syntheses, vol. IV, Bailar, McGraw-Hill Book Company, Inc.

Ruff: "Uber Verbindungendes Arsenpentafluorids und Antimonpentafluorids mit Nitrosylfluorin," Z. Anorg. Chem. 58, 325–37.

Seel et al.: "Angewandte Chemie," vol. 69, p. 135 (1957).

Simons: "Hydrogen Fluoride," pp. 246–247, from Fluorine Chemistry, vol. 1, Simons, Academic Press, Inc., N.Y., 1950.

MAURICE A. BRINDISI, *Primary Examiner.*

GEORGE D. MITCHELL, *Examiner.*